(12) United States Patent
Zhang et al.

(10) Patent No.: US 10,664,664 B2
(45) Date of Patent: *May 26, 2020

(54) USER FEEDBACK FOR LOW-CONFIDENCE TRANSLATIONS

(71) Applicant: Facebook, Inc., Menlo Park, CA (US)

(72) Inventors: Ying Zhang, Turlock, CA (US); Fei Huang, Boonton, NJ (US)

(73) Assignee: FACEBOOK, INC., Menlo Park, CA (US)

( * ) Notice: Subject to any disclaimer, the term of this patent is extended or adjusted under 35 U.S.C. 154(b) by 96 days.

This patent is subject to a terminal disclaimer.

(21) Appl. No.: 15/886,817

(22) Filed: Feb. 1, 2018

(65) Prior Publication Data

US 2019/0012315 A1   Jan. 10, 2019

Related U.S. Application Data

(63) Continuation of application No. 15/221,365, filed on Jul. 27, 2016, now Pat. No. 9,922,029, which is a continuation of application No. 15/199,058, filed on Jun. 30, 2016, now abandoned.

(51) Int. Cl.
```
G06F 17/28      (2006.01)
G06F 40/51      (2020.01)
G06F 40/47      (2020.01)
G06F 40/253     (2020.01)
G06F 40/279     (2020.01)
```
(52) U.S. Cl.
CPC ............ *G06F 40/51* (2020.01); *G06F 40/253* (2020.01); *G06F 40/279* (2020.01); *G06F 40/47* (2020.01)

(58) Field of Classification Search
CPC .............. G06F 17/289; G06F 17/2818; G06F 17/2827; G06F 17/2854; G06F 17/2836
See application file for complete search history.

(56) References Cited

U.S. PATENT DOCUMENTS

| | | | |
|---|---|---|---|
| 9,563,625 B2* | 2/2017 | Bangalore | G06F 17/2836 |
| 2005/0288920 A1* | 12/2005 | Green | G06F 17/2785 |
| | | | 704/3 |
| 2006/0095248 A1* | 5/2006 | Menezes | G06F 17/28 |
| | | | 704/3 |

(Continued)

*Primary Examiner* — Richemond Dorvil
*Assistant Examiner* — Mark Villena

(57) ABSTRACT

A machine translation system can improve results of machine translations by employing preferred translations, such as human translated phrases. In some implementations, the machine translation system can use the preferred translations as heavily weighted training data when building a machine translation engine. In some implementations, the machine translation system can use the preferred translations as an alternate to a result that would have otherwise been produced by a machine translation engine. While it is infeasible to obtain human translations for all translation phrases, preferred translations can be used for problem phrases for which machine translation engines often produce poor translations. The machine translation system can identify problem phrases by assigning a quality score to each translation in a set of translations. The machine translation system can identify, as the problem phrases, n-grams that appear with a frequency above a frequency threshold in translations with quality scores below a threshold.

20 Claims, 6 Drawing Sheets

(56) References Cited

U.S. PATENT DOCUMENTS

| | | | | |
|---|---|---|---|---|
| 2008/0195372 A1* | 8/2008 | Chin | .................... | G06F 3/0481 |
| | | | | 704/2 |
| 2011/0082683 A1* | 4/2011 | Soricut | ................ | G06F 17/289 |
| | | | | 704/2 |
| 2012/0221319 A1* | 8/2012 | Trese | .................. | G06F 17/2836 |
| | | | | 704/2 |
| 2012/0330990 A1* | 12/2012 | Chen | ....................... | G06F 17/28 |
| | | | | 707/761 |
| 2013/0144594 A1* | 6/2013 | Bangalore | ........... | G06F 17/2836 |
| | | | | 704/2 |
| 2013/0231914 A1* | 9/2013 | Powalowski | ........ | G06F 3/0487 |
| | | | | 704/3 |
| 2014/0188856 A1* | 7/2014 | Jiang | .................. | G06F 16/3337 |
| | | | | 707/723 |
| 2014/0288915 A1* | 9/2014 | Madnani | ............... | G06F 17/274 |
| | | | | 704/2 |
| 2015/0286632 A1* | 10/2015 | Meunier | ............. | G06F 17/2854 |
| | | | | 704/2 |
| 2016/0124944 A1* | 5/2016 | Andreoli | ............ | G06F 17/2854 |
| | | | | 704/2 |

\* cited by examiner

USER FEEDBACK FOR LOW-CONFIDENCE TRANSLATIONS

CROSS-REFERENCE TO RELATED APPLICATIONS

This application is a continuation of U.S. patent application Ser. No. 15/221,365, entitled "USER FEEDBACK FOR LOW-CONFIDENCE TRANSLATIONS," filed on Jul. 27, 2016; which is a continuation of U.S. patent application Ser. No. 15/199,058, entitled "USER FEEDBACK FOR LOW-CONFIDENCE TRANSLATIONS," filed on Jun. 30, 2016; which are incorporated herein by reference in their entireties.

BACKGROUND

The Internet has made it possible for people to connect and share information globally in ways previously undreamt of. Social media platforms, for example, enable people on opposite sides of the world to collaborate on ideas, discuss current events, or share what they had for lunch. In the past, this spectacular resource has been somewhat limited to communications between users having a common natural language ("language"). In addition, users have only been able to consume content that is in their language, or for which a content provider is able to determine an appropriate translation.

While communication across the many different languages used around the world is a particular challenge, several machine translation engines have attempted to address this concern. Machine translation engines enable a user to select or provide a content item (e.g., a message from an acquaintance) and quickly receive a translation of the content item. Machine translation engines can be created using training data that includes identical or similar content in two or more languages. Multilingual training data is generally obtained from news reports, parliament domains, "wiki" sources, etc. However, the machine translation engines created using this traditional multilingual training data have proven to be less than perfect. This is in part due to imperfections in the training data and in part because of the inability of the machine translation engine creation process to correctly create mappings between language phrases. As a result, the translations created by machine translation engines are often distrusted.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
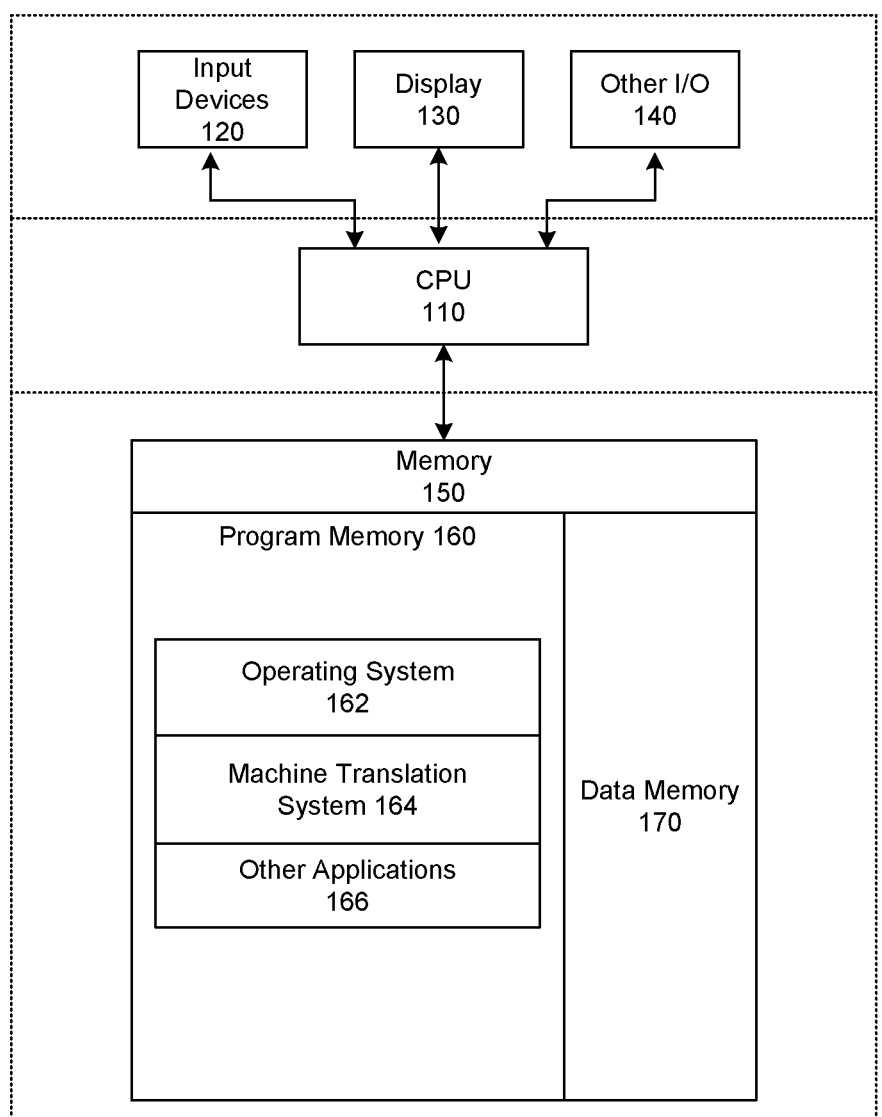
FIG. 1 is a block diagram illustrating an overview of devices on which some implementations can operate.

Embodiments for obtaining improved machine translations of content items are described. A "content item," as used herein, refers to digital visual or audio data that includes a representation of one or more words or groups of characters from a natural language. In some implementations, content items can be obtained from social network items, such as posts, news items, events, shares, comments, etc. In various implementations, a machine translation system can obtain improved machine translation results by building improved machine translation engines using improved training data or by modifying the results provided by machine translation engines with alternate phrase mappings. Items of improved training data or identified alternate phrase mappings, referred to herein as "preferred translations," can include a source phrase in a source language and one or more translations of that source phrase, each of the one or more translations in a corresponding output language. The machine translation system can obtain preferred translations by providing a set of phrases to more reliable translators, such as more sophisticated machine translation engines or human translators.

While it is infeasible to obtain preferred translations for every phrase, the machine translation system can obtain preferred translations for problem phrases. As used herein, a "problem phrase" is a phrase that, when appearing in a content item to be translated by a machine translation engine, likely results in a low-quality translation. The machine translation system can identify problem phrases by assigning a confidence score to each translation in a set of translations, such as based on user scores of each translation or algorithmically assigned scores. The machine translation system can extract all n-grams of particular lengths, such as three, four, or five words, from the translations that have a score below a score threshold, referred to herein as "low scoring translations." An "n-gram," as used herein, is an ordered sequence of one or more words, where "words" can be traditional words, i.e. characters separated by whitespace or punctuation, or can be other character groupings, such as a specified number of characters. An n-gram length refers to the number of defined words in the n-gram. Each of the extracted n-grams can then be assigned an n-gram score based on one or more of: a frequency value indicating how often that n-gram appears in the low scoring translations, user or confidence scores for the low scoring translations, or a confidence score generated for that n-gram. The machine translation system can identify n-grams with an n-gram score below an n-gram score threshold as problem phrases.

In some implementations, the machine translation system can use preferred translations for the identified problem phrases as training data when building new machine translation engines. In some implementations, these preferred translations can be heavily weighted in the training data. For example, part of a machine translation engine can be a trained neural network. When training this neural network, the machine translation system can provide confidence scores corresponding to some or all of the training data, which can control how much node weights or weights of links between nodes in the neural network are adjusted based on a comparison of the output from the neural network for a given input and a preferred output. As another example, part of a machine translation engine can be created to include mappings between input and output phrases and weights for the mappings can be used as part of the process for selecting which phrase mappings to use when performing a translation.

In some implementations, the machine translation system can use the preferred translations to augment translation engines to identify phrases in an item to be translated that match a source phrase in preferred translation. For these matching phrases, the machine translation engine can use the corresponding output phrase from that matching known preferred translation instead of a result that would have otherwise been produced by a machine translation engine.

Performing machine translations can include sophisticated technical algorithms such as methods for determining and applying phrase correspondences between languages, methods for selecting training data and language corpus data, and methods for formatting data to be provided to models and adjusting models based on the results. Some machine translation engines can produce multiple translations for a single source phrase. In addition, different levels and methods of machine translations can be created and used, such as translators that use different amounts of processing power, use different language corpuses for probability distributions, etc. The disclosed machine translation system can improve machine translations by identifying problem phrases for which additional resources can be applied to create machine translation engines that provide better translations or to use alternate translations in place of machine translation engine results.

Several implementations are discussed below in more detail in reference to the figures. Turning now to the figures, FIG. 1 is a block diagram illustrating an overview of devices on which some implementations of the disclosed technology can operate. The devices can comprise hardware components of a device 100 that can identify problem phrases, obtain preferred translations, and use the preferred translations to perform improved machine translations. Device 100 can include one or more input devices 120 that provide input to the CPU (processor) 110, notifying it of actions. The actions are typically mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some examples, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 can have access to a memory 150. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 can include program memory 160 that stores programs and software, such as an operating system 162, machine translation system 164, and other application programs 166. Memory 150 can also include data memory 170 that can include, for example, translations, in some cases paired with source content items; scores for translations, such as user scores or programmatically determined scores; identifications of low scoring translations; overall scores for n-grams; preferred translations of n-grams; machine translation engines; configuration data, settings, user options or preferences, etc., which can be provided to the program memory 160 or any element of the device 100.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
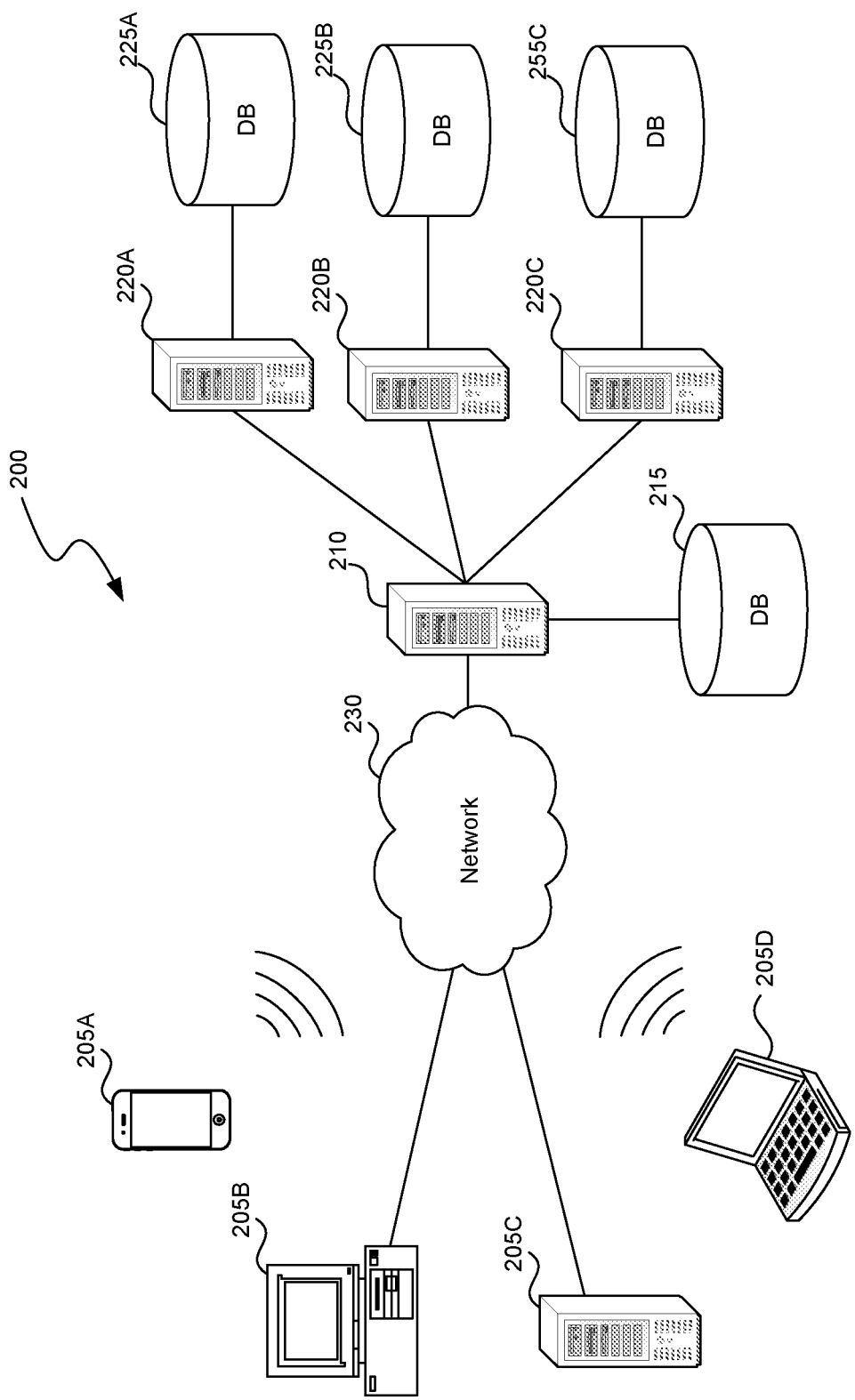
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections 210 through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information such as translations, in some cases paired with a source content item; scores for translations, such as user scores or programmatically determined scores; identifications of low scoring translations; overall scores for n-grams; preferred translations of n-grams; machine translation engines; machine translation training data; etc. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
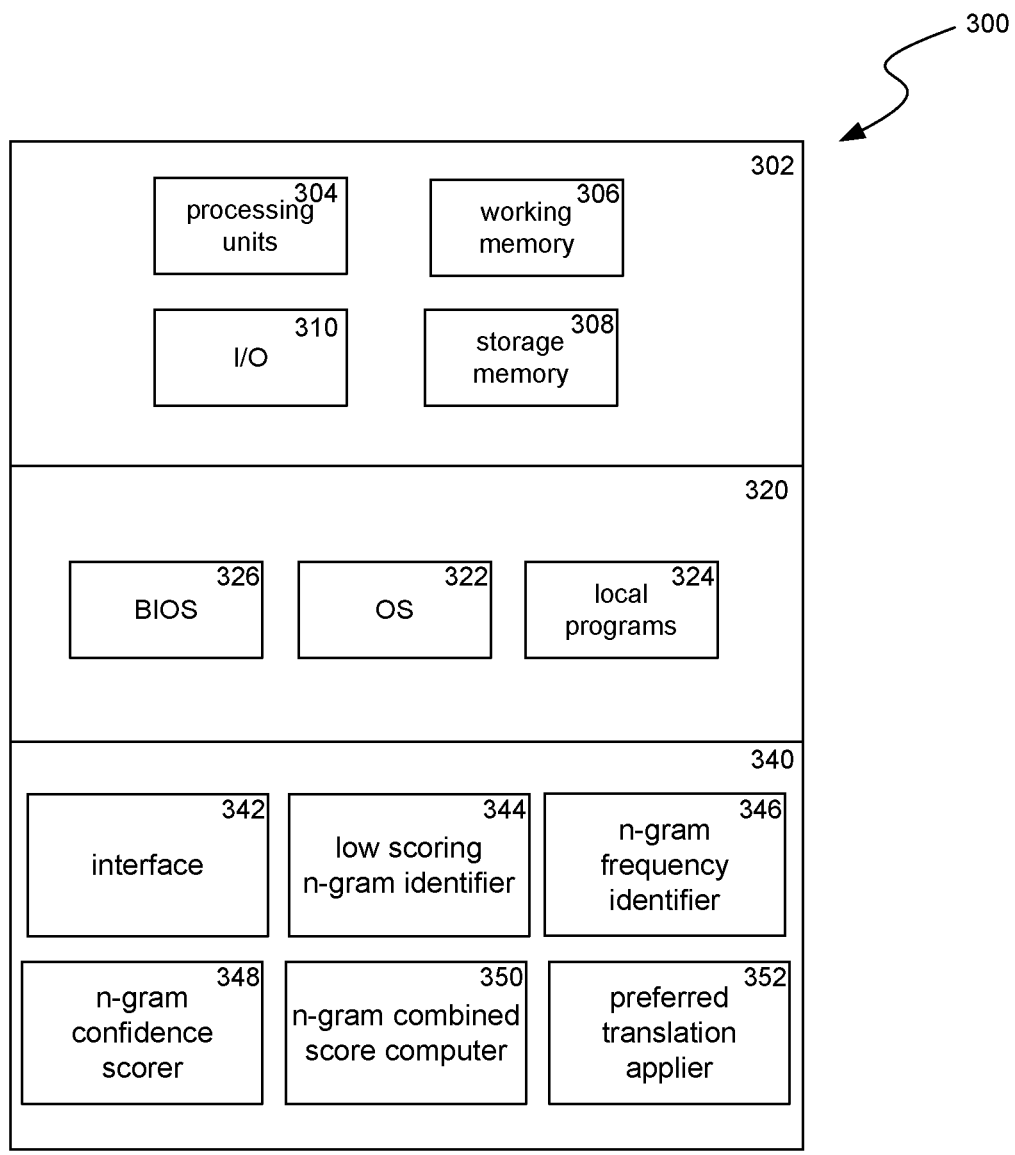
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308, and input and output devices 310. Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include low scoring n-gram identifier 344, n-gram frequency identifier 346, n-gram confidence scorer 348, n-gram combined score computer 350, preferred translation applier 352, and components which can be used for transferring data and controlling the specialized components, such as interface 342. In some implementations, components 300 can be in a computing system that is distributed across multiple computing devices or can include an interface to a server-based application.

Low scoring n-gram identifier 344 can be configured to identify the n-grams appearing in low scoring content items. Low scoring n-gram identifier 344 can receive, through interface 342, a set of one or more translations of content items. In some implementations, the received translations can each be associated with a user score, computed based on one or more user ratings indicating the quality of the corresponding translation. In some implementations, the user ratings can be explicit, such as users selecting a 1-5 star rating for the translation, clicking a thumbs-up icon for the translation, etc. In some implementations, the user ratings can be implicit, e.g. how often a translation is viewed, "liked," responded to, reposted, etc. In some implementations, the score associated with each translation can be based on factors alternate to, or in addition to, user ratings. For example, translation scores can be based on an analysis of the content of the translations, such as how closely the phrases in the translation match phrases in a language corpus. Low scoring n-gram identifier 344 can select, from the received translation, those that are associated with a score below a threshold. Low scoring n-gram identifier 344 can identify n-grams from the selected translations. In some implementations, the identified n-grams can be the n-grams of one or more specified lengths from the selected translations, such as 3, 4, or 5 words. In some implementations, low scoring n-gram identifier 344 can sort the identified n-grams, such as based on length, which translations that n-gram appears in, or alphabetically.

N-gram frequency identifier 346 can be configured to receive the n-grams identified by low scoring n-gram identifier 344 and attribute to each a frequency score. In various implementations, the frequency score can be a count of the number of times each n-gram appears in the selected translations or a count of the translations that the n-gram appears in. For example, if the low scoring translations include "It's my birthday and it's my party" and "It's my purgative," and the length of the n-grams is 2, the low scoring n-grams would be: "It's my" "my birthday" "birthday and" "and it's" "it's my" "my party" "It's my" and "my purgative." The frequency score for the n-gram "It's my" would be two if the frequency is a count of the low scoring translations the n-gram appears in. Alternatively, the frequency score for the n-gram "It's my" would be three if the frequency is a total count of times the n-gram appears in the low scoring translations. In some implementations, the frequency score can be further based on one or more of the size of the set of translations received by low scoring n-gram identifier 344, the number of low scoring translations, the number of low scoring n-grams, or lengths of the low scoring translations. For example, the frequency can be a ratio of a count of a low scoring n-gram in the low scoring translations to a count of all the n-grams in the low scoring translations. In the previous example, for "It's my" this frequency score could be 3:8 or ⅜ or 0.375.

N-gram confidence scorer 348 can be configured to determine a confidence score for the n-grams identified by low scoring n-gram identifier 344. The confidence score can be an estimation of the quality of each n-gram as a translation of a source content item. In various implementations, this confidence score can be performed by: determining how well the n-gram conforms to identified grammatical rules from a language that the translation the n-grams was taken from is in; how rare portions of the n-gram are in a language corpus for the language that the translation the n-grams was taken from; how users of a social media system have reacted to or interacted with the translation the n-grams was taken from; etc. In some implementations, n-gram confidence scores can be determined using translation confidence scoring technology, described in U.S. patent application Ser. No. 14/967,897, titled "Translation Confidence Scores," incorporated herein by reference.

N-gram combined score computer 350 can be configured to compute an overall score for each n-gram identified by low scoring n-gram identifier 344. In some implementations, each overall score can be based on a combination of overall score components comprising the frequency score computed by n-gram frequency identifier 346 and one or both of: the user ratings for the translation the n-grams was taken from or the confidence score for the n-gram computed by n-gram confidence scorer 348. In some implementations, the overall score for each n-gram can be the frequency score computed by n-gram frequency identifier 346 without being combined with other scores. In some implementations, the overall score can be computed by adding or multiplying the overall score components. In some implementations, the overall score components can be normalized to the same scale, such as a 0-1 scale. In some implementations, the overall score components can be weighted before they are combined, such as by placing an emphasis on the frequency score and deemphasizing the user rating. In some implementations, the overall score can be normalized to a particular scale after the overall score components are combined.

Preferred translation applier 352 can be configured to select the n-grams that have an overall score below a threshold and obtain preferred translations for the selected n-grams. In some implementations, preferred translations can be obtained by providing a part of the source content item that was translated into a selected n-gram to human translators to create a preferred translation of that part of the source content item. The preferred translation can comprise a source, e.g. the part of the source content item that was translated into the selected n-gram, and a translation, e.g. the human translation of the source. In some implementations, preferred translation applier 352 can use the preferred translations as part of a set of training data to train a new machine translation engine, which can be weighted heavily due to the high confidence placed on the human translation. In some implementations, preferred translation applier 352 can augment machine translation engines such that, when an augmented machine translation engine is tasked with translating a content item, any phrases in the content item matching a source of one of the preferred translations can be translated using the translation in the preferred translation, instead of results that would otherwise be produced by the machine translation engine. When determining which preferred translation to use, preferred translation applier 352 can select the preferred translations that have a source matching the longest phrase in the item to be translated.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
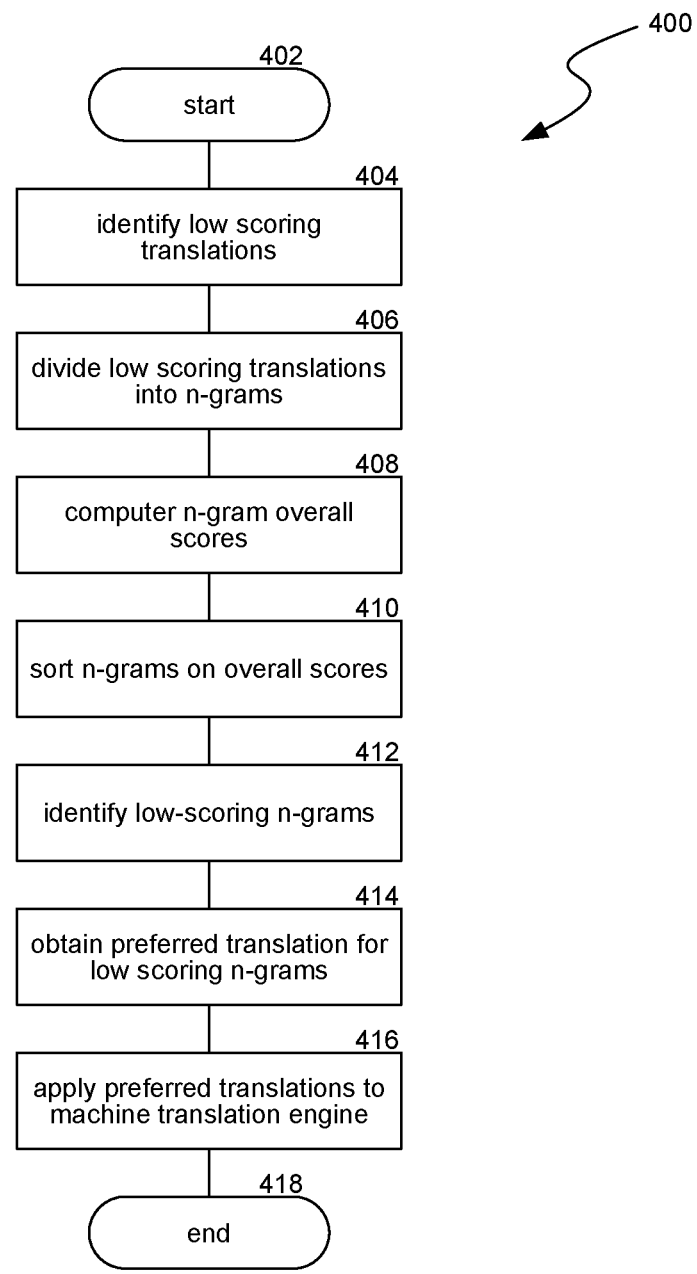
FIG. 4 is a flow diagram illustrating a process used in some implementations for identifying problem phrases to be used as a basis for obtaining preferred translations.

FIG. 4 is a flow diagram illustrating a process 400 used in some implementations for identifying problem phrases to be used as a basis for obtaining preferred translations. Process 400 begins at block 402 and continues to block 404. At block 404, process 400 can identify one or more low scoring translations, e.g. translations that are associated with a translation score below a threshold. In some implementations, low scoring translations can be identified based on user scores indicating the user's perceived quality of the translation. For example, in a social media system, translations of content items can be presented with an interface for users to indicate a quality of the translation, such as a star rating, a thumbs up or thumbs down rating, an opportunity to suggest corrections, or another way to indicate whether they approve of the translation. In some implementations, the translation score can be a confidence score computed for the translation. Such confidence scores can be based on an analysis of the content of the translations, such as how well they conform to grammatical rules of the output language of the translation or how likely phrases in the translation are to occur in the output language, such as based on a corpus in that output language. The confidence scores can also be based on context or usage of the translation, such as how often a translation is viewed, reposted, responded to, shared, liked, etc. In some implementations, the translation score can be a combination of user scores and the confidence scores.

In some implementations, referred to herein as the "high scoring implementations" instead of identifying translations with a translation score below a lower threshold, process 400 can identify translations with a score above a higher threshold. In the high scoring implementations, instead of attempting to find translations that should be replaced with preferred translations, the goal can be to find translations that are performed well by machine translation engines, and that should be reinforced in training future machine translation engines.

At block 406, process 400 can divide the identified low scoring translations into n-grams. The n-grams can have one or more specified lengths, such as one or more of: 2, 3, 4, 5, 6, or 7 words. For example, the specified lengths can be n-grams of either 4 or 5 words. In various implementations, the n-grams can be all possible n-grams or can be all non-overlapping n-grams.

At block 408, process 400 can compute an overall score for each n-gram identified at block 406. Computing an overall score for an n-gram can be performed by combining one or more of: a measure of a frequency with which that n-gram occurs in the low scoring translations (as a count of the low scoring translations that n-gram appears in or a count of the number of times that n-gram appears in the low scoring translations), the user ratings of the low scoring translations that n-gram appears in, or a confidence rating for that n-gram as a translation. Additional details regarding computing n-gram overall scores are provided below in relation to FIG. 5.

At blocks 410 and 412, process 400 can identify the n-grams that have an overall score below a threshold, e.g. by comparing each n-gram's overall score to a threshold value. In various implementations, identifying these low scoring n-grams can comprise selecting a bottom number of n-grams or n-grams with an overall score in a bottom percentage, which can comprise sorting, at block 410, the n-grams identified at block 406 according to the overall scores computed at block 408. In the high scoring implementations, at block 410 and 412, n-grams can be selected that have an overall score above a threshold. In some implementations, both (A) low scoring n-grams can be identified to be replaced in training data or machine translation engine execution with preferred translations and (B) high scoring n-grams can be identified to be given greater weight in training data or translations.

At block 414, process 400 can provide the low scoring n-grams identified at block 412 to an alternate translation system and obtain, from the alternate translation system, preferred translations of the low scoring translations. In some implementations, the preferred translations can be created by human translators. In some implementations, each preferred translation for an n-gram can be created by a more sophisticated machine translation engine than the one that created the n-gram. In the high scoring implementations, instead of obtaining preferred translations from an alternate translation system, the high scoring n-grams identified at block 412, paired with the portion of the source content item that was translated into that n-gram, can be selected as preferred translations.

At block 416, process 400 can apply the preferred translations identified at block 414 to one or more machine translation engines. In some implementations, applying the preferred translations can comprise including the preferred translations in training data when building a machine translation engine. In some implementations, these preferred translations in the training data can be given greater priority or weight than other training data. In some implementations, applying the preferred translations can comprise augmenting one or more machine translation engines to use the preferred translations instead of having that translation perform a normal translation. For example, a preferred translation can be: {source (sp): soy aqui; translation: I'm here}. When a translation engine is tasked with translating "Soy agui, ultra ves," the translation can match the phrase "soy agui" to the preferred translation source and, instead of applying models in the translation engine that would have produced the translation "here I am" can use the preferred translation of "soy aqui" to be translated as "I'm here." Once process 400 has applied the preferred translations, it can continue to block 418, where it ends.

Figure 5:
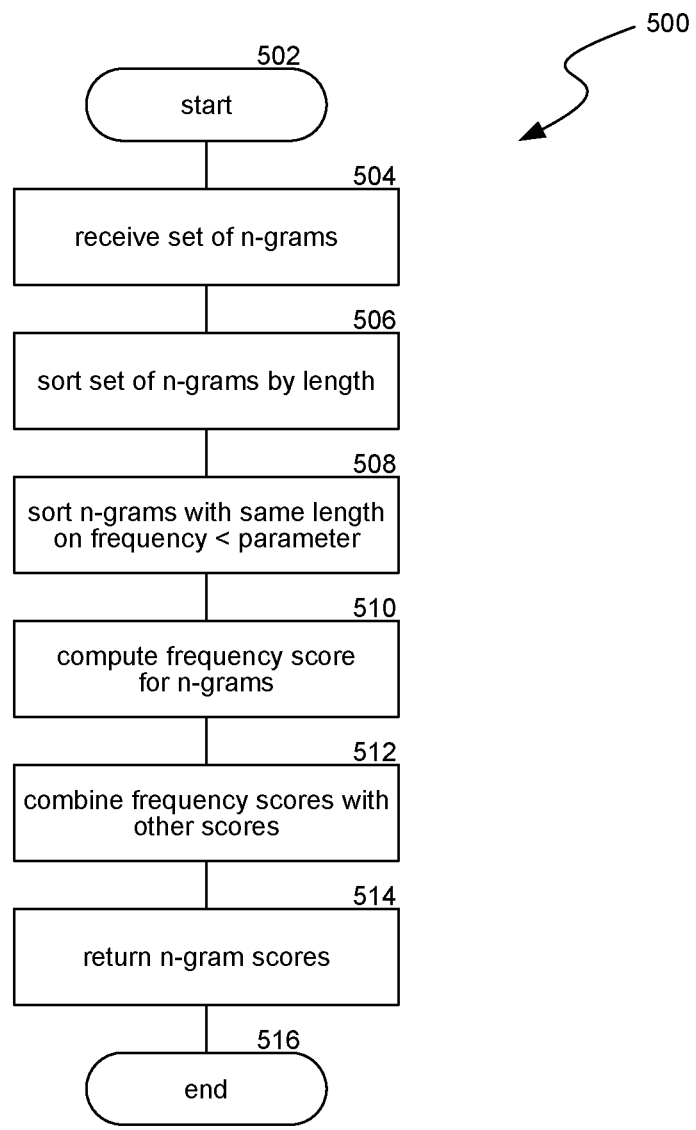
FIG. 5 is a flow diagram illustrating a process used in some implementations for computing n-gram confidence scores.

FIG. 5 is a flow diagram illustrating a process 500 used in some implementations for computing n-gram confidence scores. In some implementations, process 500 can be called by process 400, such as at block 408. Process 500 begins at block 502 and continues to block 504. At block 504, process 500 can receive a set of n-grams, such as the n-grams identified at block 406 of process 400. In some implementations, the set of n-grams can be parts of a translation, and the source content item of that translation can also be received.

At block 506, process 500 can sort the received set of n-grams according to their lengths. In some implementations, process 500 can skip this sorting, such as if the n-grams are all the same length or if the n-grams were pre-sorted before they were received. At block 508, process 500 can sort the n-grams of each length based on a frequency parameter. In some implementations, the frequency parameter can be a count of translations each unique n-gram appears in, in which case the n-grams can be sorted within each n-gram length according to which translations that n-gram appears in. In some implementations, the frequency parameter can be a total count of unique n-grams, in which case the n-grams can be sorted within each n-gram length, such as alphabetically.

At block 510, process 500 can compute a frequency score, e.g. total count or translation item frequency count, for each unique n-gram. In some implementations, process 510 can adjust the frequency scores for each n-gram based on e.g. the average length of the translations the n-gram appears in. In some implementations, n-grams can be removed from the set of n-grams when an n-gram with a frequency score below a threshold subsumes that n-gram. For example, if two n-grams in the set include "Let's share a cab" and "share a cab" and the frequency score for "Let's share a cab" is below a threshold, "share a cab" can be removed from the set of n-grams.

In some implementations, computing a total count of unique n-grams or a count of unique translations that each unique n-gram appears in can be performed without the sorting described in relation to block 506 and 508. For example, process 500 can perform an outer loop, going through the set of n-grams, setting each as a selected n-gram. For each selected n-gram of the outer loop, process 500 can perform an inner loop, going through the remaining n-grams in the set and removing particular n-grams that match the selected n-gram and incrementing a counter for the selected n-gram when removing each particular n-gram matching the selected n-gram.

At block 512, process 500 can compute an overall score for each n-gram by combining the frequency score for each n-gram in the set with one or more other scores. These other scores can include one or both of a confidence score for each portion of the translation corresponding to an n-gram or a combined user score for each portion of the translation corresponding to an n-gram. In some implementations, the overall score for one or more of the n-grams can be the frequency score for that n-gram. At block 514, process 500 can then return the overall n-gram scores. Process 500 then continues to block 516, where it ends.

Figure 6:
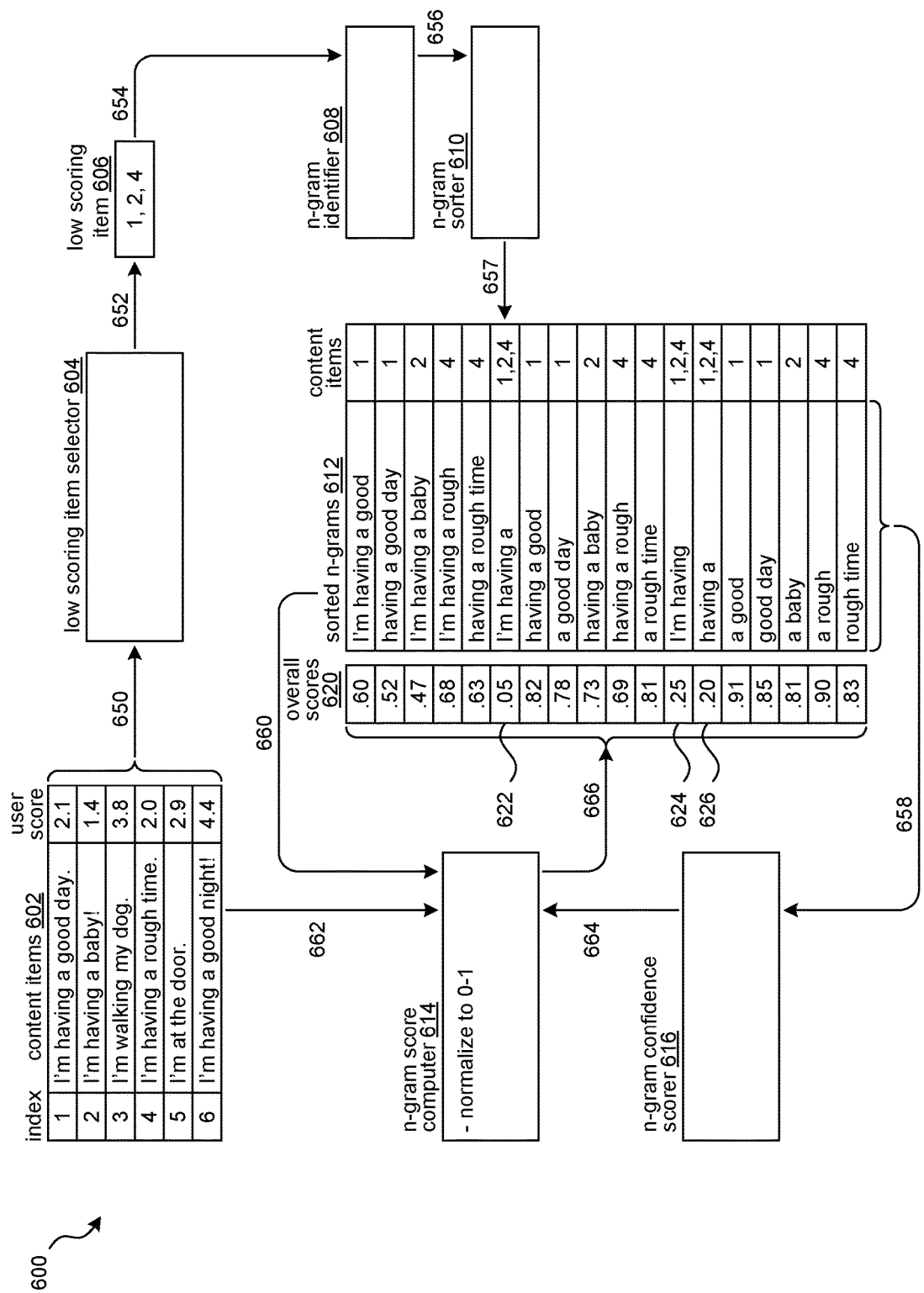
FIG. 6 is a block diagram illustrating an example showing some implementations of identifying problem phrases to be used for obtaining preferred translations.

FIG. 6 is a block diagram illustrating an example 600 showing some implementations of identifying problem phrases to be used for obtaining preferred translations. Example 600 starts with a set of content items 602, where each content item is a translation of a source content item that was translated from a source language. Each content item is also associated with a user score that is a combination of user ratings for the quality of that content item as a translation of the source content item. In example 600, the user ratings are on a 1-5 scale.

At 650, example 600 provides content items 602 to a low scoring item selector 604. Low scoring item selector 604 has a threshold value, which in example 600 is 2.5. Low scoring item selector 604 selects, at 652, low scoring items 606 from content items 602. Low scoring items 606 in example 600 are content items 1, 2, and 4 which have a user score below the 2.5 threshold.

At 654, example 600 provides low scoring items 606 to n-gram identifier 608. N-gram identifier 608 tokenizes each content item at a word level, such as on whitespace and certain punctuation, and identifies each n-gram of set lengths. In example 600 the set lengths are two, three, or four words. In example 600, the n-grams are overlapping n-grams. For example, the n-grams for content item 2 include "I'm having a baby," "I'm having a," "having a baby," "I'm having," "having a," and "a baby." The complete list of unique n-grams identified by n-gram identifier is provided as sorted n-grams 612.

At 656, example 600 provides the n-grams identified by n-gram identifier 608 to n-gram sorter 610. N-gram sorter 610 sorts the n-grams according to length and combines the n-grams that are the same, keeping track of which posts that n-gram appears in. N-gram sorter 610 produces, at 657, sorted n-grams 612, which includes a list of the unique n-grams and an identification of which of the low scoring posts that n-gram appears in.

In some implementations, a count of the low scoring posts each n-gram appears in or a count of the number of times each n-gram appears in the low scoring posts can be used as an overall score for that n-gram. However, in example 600, the overall score is further based on an n-gram confidence score and the content item user scores. At 658, example 600 provides the n-grams 612, along with associated portions of a source item that was translated into that n-gram (not shown), to n-gram confidence scorer 616. At 664, n-gram confidence scorer 616 provides, to n-gram score computer 614, a confidence score for each n-gram indicating an estimated quality of the n-gram as a translation of the portion of the source item that was translated into that n-gram. The n-gram confidence score can be computed using translation confidence scoring technology, described in U.S. patent application Ser. No. 14/967,897, titled "Translation Confidence Scores," incorporated herein by reference.

At 660, n-gram score computer 614 receives the frequency score for each n-gram of n-grams 612, in this case on a 0-1 scale indicating what percentage of the low scoring content items each n-gram appears in. For example, the frequency score for the n-gram "I'm having a" is 1 because "I'm having a" appears in all the low scoring content items. At 662, n-gram score computer 614 receives the user score for each content item from which n-grams 612 were created, also on a 0-1 scale. The user score for each n-gram can be an average of the user scores for the content items that n-gram appears in. For example, the base user scores for the content items containing the n-grams "I'm having a" are 0.42 (2.1/5), 0.28 (1.4/5), and 0.40 (2.0/5), the average user score for "I'm having a," then, is 0.3667. In some implementations, the user scores could also account for content items that did not qualify as low scoring, such as content item 6 "I'm having a good night," which would add a score of 0.88 (4.4/5), resulting in the average user score for "I'm having a," to be 0.495.

At 664, n-gram score computer 614 receives the confidence scores from n-gram confidence scorer 616, which can also be normalized to a 0-1 scale. N-gram score computer 614 then combines these scores into a score for each n-gram, such as by averaging them. In some implementations, these scores can be weighted. For example, the frequency score can be weighted three times as heavily as the user scores. As another example, the confidence scores can be weighted two times as heavily as the user scores.

At 666, example 600 can produce, from n-gram score computer 614, the overall scores 620, one corresponding to each of n-grams 612. N-grams with a corresponding overall score below a threshold, in this example 0.4, are selected as problem phrases to have corresponding preferred translations created. In this case, the n-grams corresponding to scores 622 "I'm having a," 624 "I'm having," and 626 "having a" are selected to have preferred translations created.

In particular embodiments, training elements and other data, e.g. data from an online social network, may be associated with privacy settings. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums).

As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, a social-networking system may send a request to the data store for the object. The request may identify the user associated with the request and may only be sent to the user if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. Although this disclosure describes enforcing privacy settings in a particular manner, this disclosure contemplates enforcing privacy settings in any suitable manner.

Some embodiments described herein make use of data or metrics that may include information voluntarily provided by one or more users. In such embodiments, data privacy may be protected in a number of ways.

For example, the user may be required to, or may voluntarily, opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for augmenting a machine translation engine with preferred translations, comprising:
receiving indications of content items that are machine translations of source content items, wherein each content item is associated with a user score;
identifying, as low scoring content items, the content items that are associated with a user score below a content item threshold;
dividing the low scoring content items into multiple n-grams;
computing an overall score for one of more n-grams of the multiple n-grams; selecting, as low scoring n-grams, at least one of the one or more n-grams that has an overall score below an n-gram score threshold;
obtaining preferred translations for each of the selected low scoring n-grams, wherein each preferred translation comprises a source phrase in a first language and a translation of the source phrase in a second language; and
augmenting the machine translation engine by one or both of:
including the preferred translations in training data used to generate the machine translation engine; or
configuring the machine translation engine to, when performing a translation of an item, identify when a preferred translation matches a phrase in the item by matching the source phrases of the preferred translations to phrases in the item, and, when an identified preferred translation matches a phrase in the item, use the translation of the source phrase in that preferred translation instead of results that would otherwise be generated by the machine translation engine.

2. The method of claim 1, wherein the overall score for a selected n-gram of the one or more n-grams is based on a number of occurrences of the selected n-gram appearing in the low scoring content items.

3. The method of claim 1, wherein the overall score for a selected n-gram of the one or more n-grams is based on a number of the low scoring content items that the selected n-gram appears in.

4. The method of claim 1, wherein the overall score for a selected n-gram, of the one or more n-grams, is based on a combination of: a frequency score indicating a frequency the selected n-gram appears in the low scoring content items, the user score corresponding to the low scoring content items the selected n-gram appears in, and a confidence factor for the selected n-gram.

5. The method of claim 4, wherein the confidence factor for the selected n-gram is based on one or more of:
a determination of how well the selected n-gram conforms to an identified set of grammatical rules;
how rare portions of the selected n-gram are in an identified language corpus;
how users of a social media system have reacted to or interacted with one or more of the content items the selected n-gram was taken from; or
any combination thereof.

6. The method of claim 1, wherein the overall score for a selected n-gram of the one or more n-grams is adjusted based on an average length of the low scoring content items the selected n-gram appears in.

7. The method of claim 1, wherein at least one of the user scores is a combination of multiple individual ratings that were provided by users through an interface configured to receive user indications of a translation quality.

8. The method of claim 1, wherein dividing each of the low scoring content items into n-grams comprises one or both of:
identifying at least the n-grams with a size of four words or identifying at least the n-grams with a size of five words; and
wherein dividing at least one of the low scoring content items into n-grams comprises creating at least a first n-gram and a second n-gram where the first n-gram overlaps the second n-gram.

9. The method of claim 1, wherein at least one of the preferred translations is obtained by providing the source phrase to a human translator and receiving, from the human translator, the translation of the source phrase.

10. A non-transitory computer-readable storage medium storing instructions that, when executed by a computing system, cause the computing system to perform operations for augmenting a machine translation engine with preferred translations, the operations comprising:
 identifying, as low scoring content items, content items that are associated with a user rating below a content item threshold;
 dividing the low scoring content items into multiple n-grams;
 computing an overall score for each selected n-gram of the multiple n-grams by one or both of:
  computing a frequency that the selected n-gram appears at least once in each of the low scoring content items; or
  computing a frequency that the selected n-gram appears in the low scoring content items;
 selecting, as low scoring n-grams, at least one of the one or more n-grams that has an overall score below an n-gram score threshold;
 obtaining preferred translations for each of the selected low scoring n-grams, wherein each preferred translation comprises a source phrase in a first language and a translation of the source phrase in a second language; and
 generating the machine translation engine using training data that includes the preferred translations, wherein the preferred translations in the training data are weighted more heavily than other items in the training data that are not preferred translations.

11. The computer-readable storage medium of claim 10, wherein the overall score for a selected n-gram of the one or more n-grams is based on a number of occurrences of the selected n-gram appearing in the low scoring content items.

12. The computer-readable storage medium of claim 10, wherein the overall score for a selected n-gram of the one or more n-grams is based on a number of the low scoring content items that the selected n-gram appears in.

13. The computer-readable storage medium of claim 10, wherein the overall score for a selected n-gram, of the one or more n-grams, is based on a combination of: a frequency score indicating a frequency the selected n-gram appears in the low scoring content items, the user score corresponding to the low scoring content items the selected n-gram appears in, and a confidence factor for the selected n-gram.

14. The computer-readable storage medium of claim 13, wherein the confidence factor for the selected n-gram is based on one or more of:
 a determination of how well the selected n-gram conforms to an identified set of grammatical rules;
 how rare portions of the selected n-gram are in an identified language corpus;
 how users of a social media system have reacted to or interacted with one or more of the content items the selected n-gram was taken from; or
 any combination thereof.

15. The computer-readable storage medium of claim 10, wherein the overall score for a selected n-gram of the one or more n-grams is adjusted based on an average length of the content items the selected n-gram appears in.

16. The computer-readable storage medium of claim 10, wherein dividing at least one of the low scoring content items into n-grams comprises creating at least a first n-gram and a second n-gram where the first n-gram overlaps the second n-gram.

17. The computer-readable storage medium of claim 10, wherein at least one of the preferred translations is obtained by providing the source phrase to a human translator and receiving, from the human translator, the translation of the source phrase.

18. A system for augmenting a machine translation engine with preferred translations, the system comprising:
 a memory;
 one or more processors;
 an interface configured to receive one or more content items;
 digital low scoring n-gram identifier logic configured to be executed by the one or more processors to:
  identify, as low scoring content items, content items that are associated with a user rating below a content item threshold;
  divide the low scoring content items into multiple n-grams;
  use a n-gram frequency identifier to compute an overall score for each selected n-gram of the multiple n-grams, wherein the n-gram frequency identifier is configured to compute overall scores based on one or both of:
   a frequency that the selected n-gram appears at least once in each of the low scoring content items; or
   a frequency that the selected n-gram appears in the low scoring content items; and
  select, as low scoring n-grams, at least one of the multiple n-grams that has an overall score below an n-gram score threshold; and
 digital preferred translation applier logic configured to be executed by the one or more processors to:
  obtain preferred translations for each of the low scoring n-grams, wherein each preferred translation comprises a source phrase in a first language and a translation of the source phrase in a second language; and
  configure the machine translation engine to, when performing a translation of an item, identify when a preferred translation matches a phrase in the item by matching the source phrases of the preferred translations to phrases in the item, and, when an identified preferred translation matches a phrase in the item, use the translation of the source phrase in that preferred translation instead of results that would otherwise be generated by the machine translation engine.

19. The system of claim 18, wherein the overall score for a selected n-gram, of the one or more n-grams, is based on a combination of: a frequency score indicating a frequency the selected n-gram appears in the low scoring content items, the user score corresponding to the low scoring content items the selected n-gram appears in, and a confidence factor for the selected n-gram.

20. The system of claim 19, wherein the confidence factor for the selected n-gram is based on one or more of:
 a determination of how well the selected n-gram conforms to an identified set of grammatical rules;
 how rare portions of the selected n-gram are in an identified language corpus;
  how users of a social media system have reacted to or interacted with one or more of the content items the selected n-gram was taken from; or
 any combination thereof.

* * * * *